July 27, 1937.  C. H. KLOPFER  2,088,326
SPEEDOMETER SIGNAL
Filed April 30, 1936
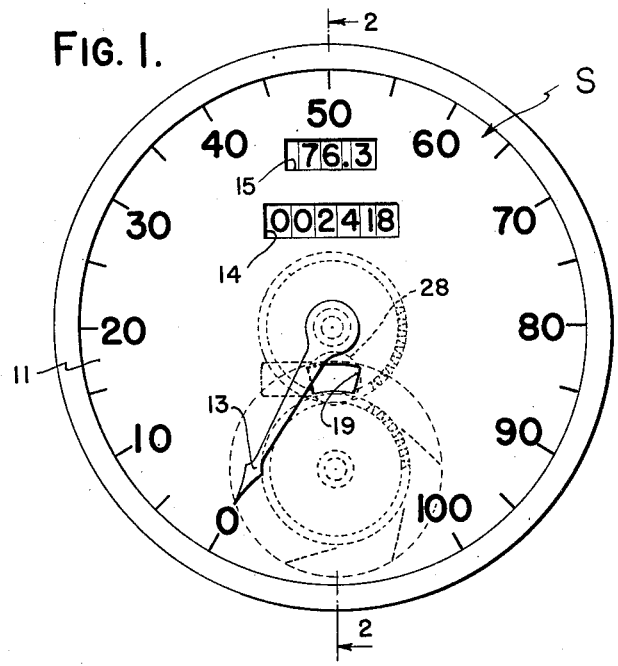
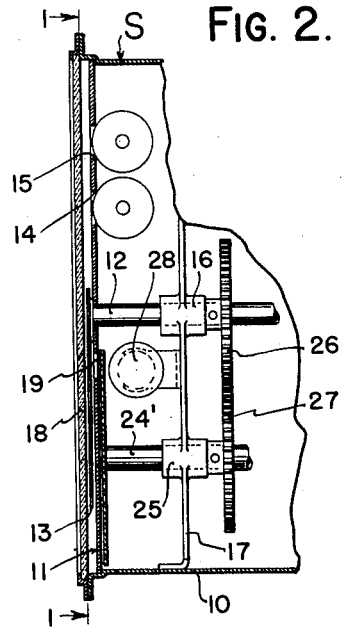
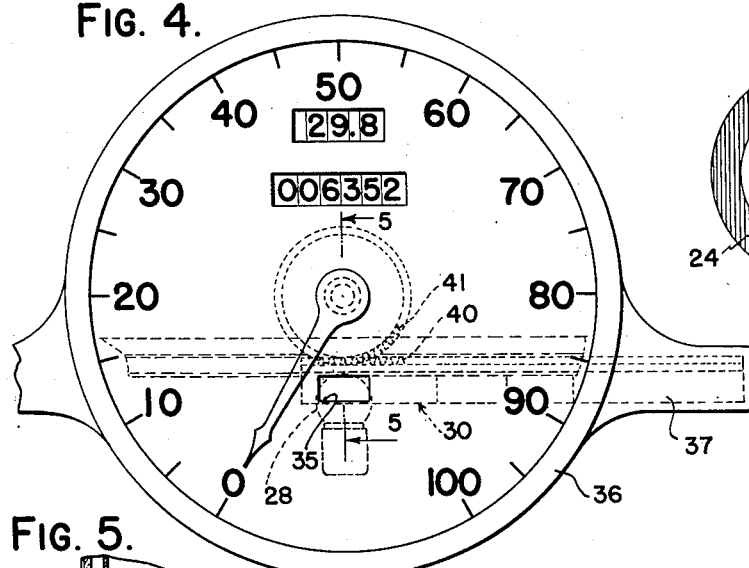
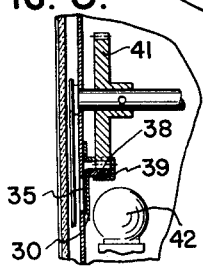
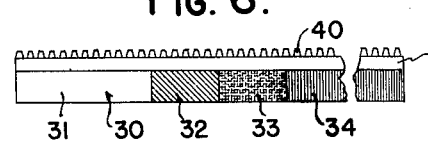
INVENTOR
CARL H. KLOPFER
BY
ATTORNEYS Patented July 27, 1937

2,088,326

UNITED STATES PATENT OFFICE 2,088,326

SPEEDOMETER SIGNAL

Carl H. Klopfer, Racine, Wis.

Application April 30, 1936, Serial No. 77,209

1 Claim. (Cl. 116—129)

This invention appertains to motor vehicles, and more particularly to a visual means for indicating the speed of a vehicle in a positive manner to the driver thereof.

As is well-known, the speed limit on city streets constitutes one speed range, say one mile to twenty miles an hour; boulevards constitute another speed range, say up to forty miles an hour; and open roads constitute another speed range, say up to sixty miles per hour. All speeds over sixty miles per hours are considered, when unforeseen hazards take place, as being dangerous. While the usual speedometer indicates miles per hour, its needle or pointer does not provide sufficient attraction for the eye, and hence persons often exceed a desired speed limit or range without having actual knowledge thereof.

It is therefore one of the primary objects of my invention to provide means for indicating different speed ranges of a vehicle by illuminated vari-colored bands so that the driver of the vehicle, by noting the color appearing on the instrument board, will instantly know the speed range in which his vehicle is traveling.

Another salient object of my invention is the provision of a colored band for indicating danger to the driver of the vehicle when the vehicle exceeds the speed range considered safe for road traveling.

A further object of my invention is the provision of novel means for incorporating the speed range colored bands in a conventional speedometer construction so that the same will be actuated in a positive manner from the mechanism thereof, and so that a compact structure will be had, which will effectively accomplish the purpose intended.

A still further object of my invention is to provide an improved speedometer of the above character, which will be durable and efficient in use, one that will be simple and easy to manufacture, and one which can be placed upon the market at a reasonable cost.

With these and other objects in view, the invention consists in the novel construction, arrangement, and formation of parts, as will be hereinafter more specifically described, claimed, and illustrated in the accompanying drawing, in which drawing:

Figure 1 is a front elevation of a speedometer constructed in accordance with my invention.

Figure 2 is a fragmentary vertical section through the same, taken substantially on the line 2—2 of Figure 1, looking in the direction of the arrows.

Figure 3 is a front elevation of a disc forming a part of my invention, and carrying the different colored bands.

Figure 4 is a front elevation showing a slightly modified form of my invention incorporated with a speedometer.

Figure 5 is a detailed fragmentary sectional view taken substantially on the line 5—5 of Figure 4, looking in the direction of the arrows.

Figure 6 is a front elevation of a strip bearing the different colored bands, which forms a part of the modified form of my invention.

Referring to the drawing in detail, wherein similar reference characters designate corresponding parts throughout the several views, the letter S generally indicates a speedometer, which can be of any preferred character or make, generally used in the automotive industry. As illustrated, the speedometer S includes a housing 10 carrying the front or dial plate 11. Rotatably extending through the axial center of the dial plate 11 is the speedometer shaft 12, which carries the indicator needle or pointer 13. This pointer travels over the outer face of the dial plate 11, which is graduated to indicate miles per hour.

The dial plate is suitably apertured, as at 14 and 15, so that the numbers bearing the total mileage and the trip miles can appear therethrough. The shaft 12, and the other parts of the speedometer described, can be operated from any desired type of mechanism, which forms no part of my present invention. The speedometer shaft 12 can be carried by a suitable bearing 16 supported by a bracket 17, arranged within the housing 10. The outer face of the dial plate 11 can be protected by a suitable glass plate 18.

In accordance with my invention I provide the dial plate 11 at the one side of the speedometer shaft 12 with an additional sight opening 19, through which is adapted to appear a disc 20. This disc 20 carries a series of different colored bands 21, 22, 23, and 24. The first band 21 is preferably white, the second band 22 is preferably green, the third band 23 is preferably yellow, and the last band is preferably red. Obviously, other colors can be used than those specified without departing from my invention.

This disc is rigidly connected at its axial center to a supporting shaft 24', which is rotatably mounted in a bearing 25 carried by the bracket 17. The shaft 24' can be driven from the speedometer shaft 12, and hence these shafts are provided respectively with gears 26 and 27, which mesh with one another.

The disc is so arranged relative to the sight opening 19 that the colored bands can be readily seen therethrough, and thus as the disc rotates, the bands one after the other will move past said sight opening.

In order to render the colors visible at night, the disc, or the periphery of the disc, is made from transparent or translucent material, and a small incandescent lamp 28 is arranged in rear of the disc so as to illuminate the same. The rays of light emanating from the incandescent light will shine through the translucent material from which the disc is made. Normally the white band 21 will appear through the sight opening, and as the speed of the vehicle picks up, and the needle or indicator pointer 13 moves over the dial plate, the white band will move across the opening. This band is of a sufficient length to appear behind the opening 19 during a speed range of the vehicle, say from one to twenty miles per hour. As soon as that mentioned speed range is exceeded, the green colored band 22 will appear in rear of the opening 19. This band can be of a sufficient length to appear in rear of the opening for a speed range of say from twenty to forty miles per hour, and when this range is exceeded, then the yellow colored band will appear. This color generally indicates caution, and is of a sufficient length to appear in rear of the opening for a speed range of say from forty to sixty miles per hour. If this range is exceeded, then the red colored band 24 will appear, which will indicate danger to the driver.

If desirable, the colored bands can be arranged to agree with speed limits on city streets, boulevards, and the like, so that a driver will instantly know when he is within a certain lawful speed range.

In lieu of utilizing the disc 20 I can provide an elongated transparent or translucent strip 30. This strip is provided with different colored bands 31, 32, 33, and 34, and these bands can be of the same color and character as the bands on the disc.

The use of the strip 30 is illustrated in Figures 4 to 6, inclusive, and the strip is adapted to appear in rear of a sight opening 35 in the dial plate of a speedometer indicated by the reference character 36. This speedometer 36 has oppositely extending, laterally disposed casings 37 formed on the sides of its housing, to permit the travel of the strip in the speedometer housing.

In order to add rigidity to the strip, and to guide the same during its travel, the rear face of the strip adjacent to its upper edge is firmly secured to a rearwardly extending flat bar 38, which travels in a longitudinally extending guideway 39, which can be secured to the rear face of the dial plate of the speedometer. The upper edge of the bar 38 has formed thereon rack teeth 40, and the speedometer shaft has keyed or otherwise secured thereto a pinion 41 for meshing with said rack teeth. Upon rotation of the speedometer shaft, the strip will be moved past the opening 35. An incandescent bulb 42, arranged in the housing on the speedometer, can be utilized for illuminating the strip.

From the foregoing description it can be seen that I have provided exceptionally simple and durable means for indicating different speed ranges of a motor vehicle by different colored bands.

Changes in details may be made without departing from the spirit or scope of my invention, but what I claim as new is:

In a speedometer, a speedometer housing, a dial plate carried thereby provided with graduations indicating miles per hour, and a sight opening; a speedometer shaft rotatably extending through the dial plate, a pointer secured to said shaft for movement around the dial plate, a disc provided with different colored bands indicating different speed ranges, the bands being movable past the sight opening, said bands being of a translucent material, a lamp disposed in rear of the disc, means for rotating the disc from the speedometer shaft in accordance with the movement of the indicator, said means including a shaft rigidly connected to the disc, and gearing connecting the speedometer shaft and the last-mentioned shaft together.

CARL H. KLOPFER.